(No Model.)  2 Sheets—Sheet 2.

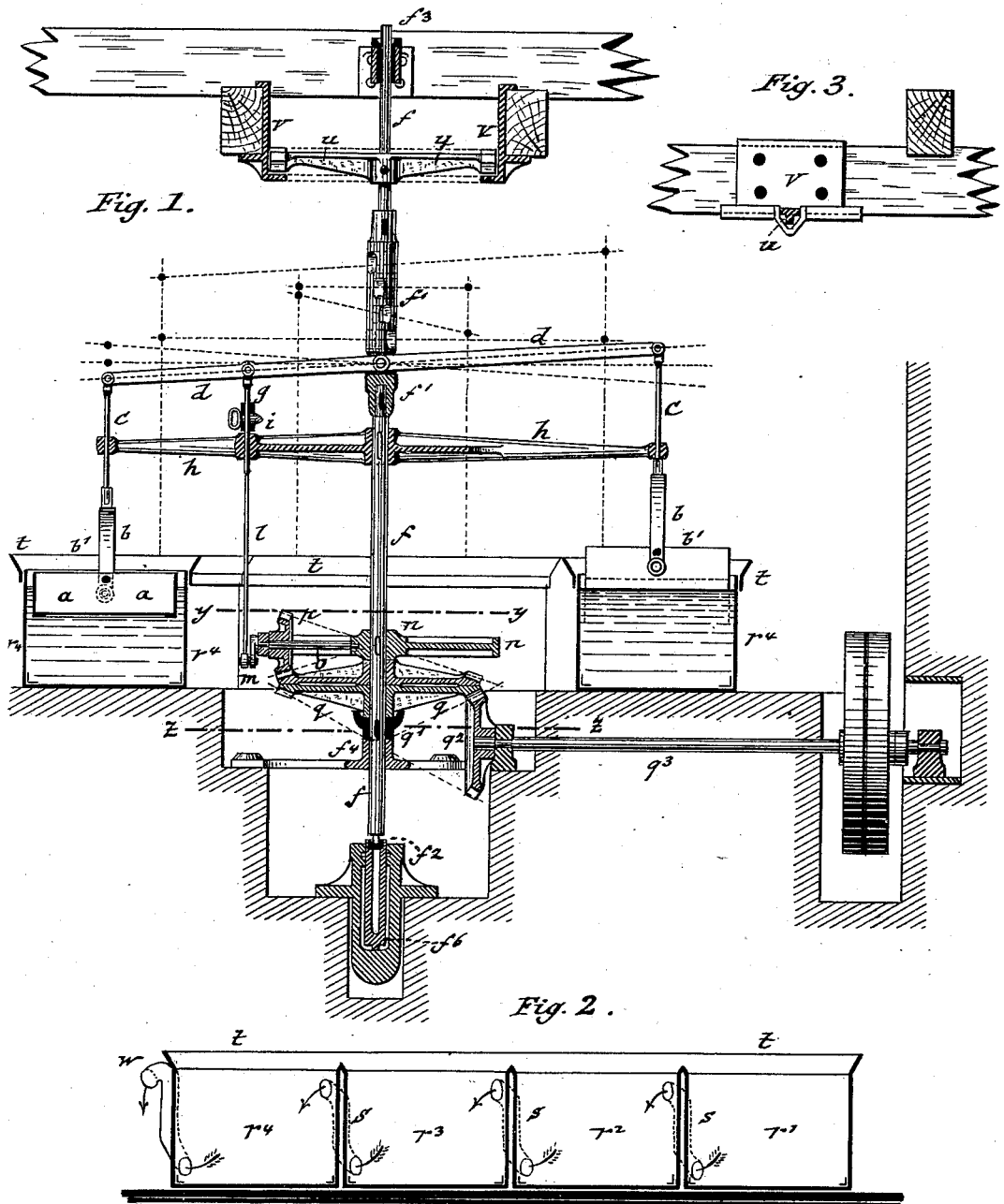

H. SCHAEDE.
APPARATUS FOR WASHING OUT OR SEPARATING SOLUBLE FROM INSOLUBLE SUBSTANCES.

No. 268,133. Patented Nov. 28, 1882.

WITNESSES:

INVENTOR
Hermann Schaede
BY Paul Goepel
ATTORNEY

UNITED STATES PATENT OFFICE.

HERRMANN SCHAEDE, OF ZEITZ, PRUSSIA, GERMANY, ASSIGNOR TO THE ZEITZER EISENGIESSEREI AND MASCHINENBAU ACTIENGESELLSCHAFT, OF SAME PLACE.

APPARATUS FOR WASHING OUT OR SEPARATING SOLUBLE FROM INSOLUBLE SUBSTANCES.

SPECIFICATION forming part of Letters Patent No. 268,133, dated November 28, 1882.

Application filed August 25, 1882. (No model.)

*To all whom it may concern:*

Be it known that I, HERRMANN SCHAEDE, a subject of the Kingdom of Prussia, German Empire, and resident of the city of Zeitz, in the Kingdom of Prussia, German Empire, have invented certain new and useful Improvements in Apparatus for Washing Out or Separating Soluble from Insoluble Substances, of which the following is a specification.

This invention has reference to an improved apparatus for washing out or separating soluble from insoluble substances; and the invention consists of a number of vertically-oscillating screen-boxes, which are suspended equidistantly from each other and the center shaft of the entire apparatus from levers that are fulcrumed to said shaft and oscillated by suitable mechanism. The screen-boxes are passed successively through a number of washing or separating tanks, a suitable number of which are arranged in battery and connected by siphon-shaped pipes for conducting the washing-liquid from one tank to the other. The center shaft is supported, by a diametrical arm having wedge-shaped ends, in a ring having corresponding depressions, so as to be prevented from turning round its axis during the washing operation. The center shaft and the oscillating screen-boxes are raised to such height that the boxes clear the separating-tanks, and then turned sufficiently, so that they can be transferred to the next adjoining tanks, and so on for repeated washing in liquid of varying degrees of concentration. The tanks connected in battery are provided at their upper edge with an inclined shedding-rim, by which the spattering of the liquid is prevented.

Figure 4:
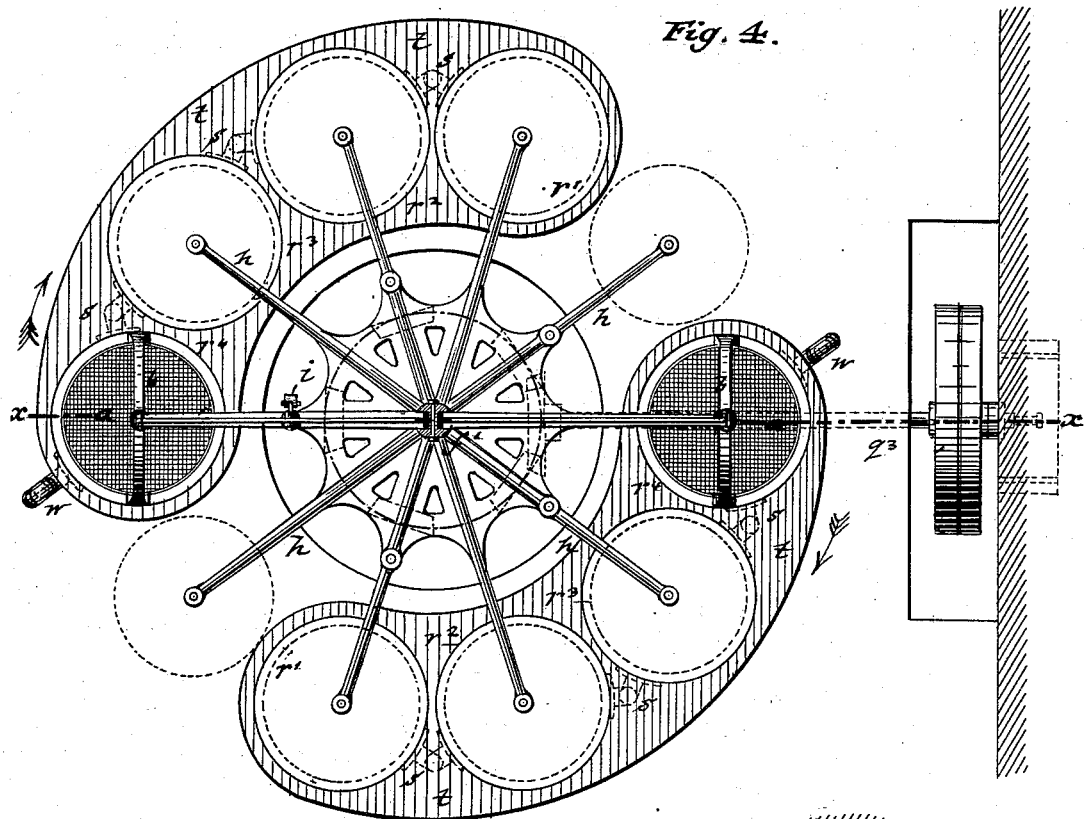
Figures 5, 6:
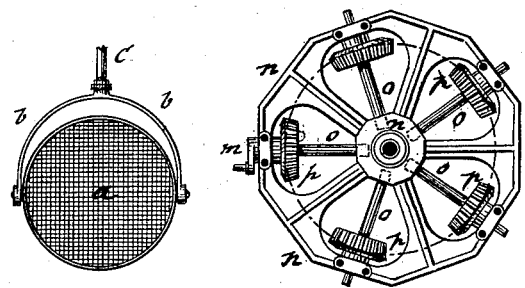
Figure 7:
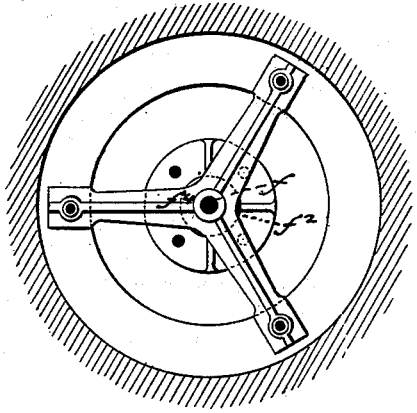

In the accompanying drawings, Figure 1 represents a vertical central section of my improved apparatus for washing out or separating soluble from insoluble substances, drawn on line $x\ x$, Fig. 4. Fig. 2 is a vertical longitudinal section of a series of separating-tanks connected in battery. Fig. 3 is a detail, showing the method of locking the center shaft of the apparatus against axial motion. Fig. 4 is a plan view of the apparatus, partly in section through the center shaft. Fig. 5 is an end view of one of the oscillating screen-boxes, shown as tilted for discharging the contents; and Figs. 6 and 7 are detail horizontal sections on lines $y\ y$ and $z\ z$, Fig. 1, showing respectively the gear for actuating the oscillating mechanisms of the screen-boxes and the lower guide-sleeve of the center shaft.

Similar letters of reference indicate corresponding parts.

Referring to the drawings, $a$ are a number of screen-boxes for the reception of the substance that is to be washed or separated in the apparatus. The screen-boxes $a$ are made of cylindrical shape, of sheet metal, and with a bottom screen. They are pivoted at diametrically-opposite points to forked semicircular bails $b$ at the lower ends of pendent rods $c$, and adapted to be locked to the bails $b$, when in horizontal position, by means of a pin, spring-catch, or key, $b'$, as shown in Fig. 1 at $b'$. By releasing the locking device of the screen-box the same may be tilted, as shown in Fig. 4. The upper ends of the pendent rods $c$ are pivoted to the outer ends of diametrical levers $d$, which are centrally fulcrumed to the vertical center shaft, $f$.

In the drawings, Fig. 2, an apparatus is shown which is arranged with five diametrical levers, which carry a screen-box $a$ at each end. The levers $d$ are centrally fulcrumed vertically, one above another, in diametrically-recessed bearings of an enlarged portion, $f'$, of the center shaft, $f$, as shown in Fig. 1. The diametrical recesses for the levers $d$ are so arranged one above the other, and at such angles to each other, that the arms of the levers $d$ extend radially from the center shaft and equidistantly from each other. To one arm of each lever $d$ is pivoted a rod, $g$, which is guided, in the same manner as the rods $c$ of the screen-boxes, in sleeves of a spider-frame, $h$, that is rigidly keyed to the center shaft, $f$. Each rod $g$ is connected by a suitable coupling, $i$, to a connecting-rod, $l$, which is applied at its lower end to a crank or eccentric, $m$, at the outer end of a short radial shaft, $o$, that turns in inner and outer bearings of a suitable supporting-frame, $n$, as shown in Figs. 1 and 6. The frame $n$ is keyed rigidly to the center shaft, $f$, and provided with as many radial shafts $o$ as there are levers $d$. The shafts $o$ are revolved by means of bevel-wheels $p$, which are actuated by the upper gear of a horizontal double bevel-wheel, $q$, which turns loosely on the center shaft, $f$, the hub of the same being supported on a fixed lubricating-cup, $q'$, keyed to the shaft $f$, as shown in Fig. 1. The lower gear of the bevel-wheel $q$ is engaged by a vertical bevel-wheel, $q^2$, which receives rotary motion from a shaft, $q^3$, and a suitable pulley-and-belt transmission, as shown in Fig. 1. The vertical center shaft, $f$, is supported by a suitable step-bearing, $f^2$, and a top bearing, $f^3$, so as to be capable of rotation around its axis. It is furthermore supported above the step-bearing $f^2$ by a guide-sleeve, $f^4$, of a three-armed frame, $f^5$, so as to be capable of being raised or lowered in the guide-sleeve $f^4$ and the neck-bearing $f^3$, either by means of a suitable lever arrangement, or preferably by a hydraulic jack, $f^6$, arranged in connection with the step-bearing, as shown in Fig. 1, whereby the center shaft, with its levers, oscillating screen-boxes, and the actuating mechanism of the same, may be raised to a certain height. The oscillating motion of the screen-boxes is thereby interrupted, so that the entire system of screen-boxes may be turned axially with the center shaft. On lowering the center shaft to its former position the motion-transmitting gears of the screen-boxes are returned into mesh with the actuating bevel-wheel $q^2$, so that the oscillating motion of the screen-boxes is resumed. The center shaft, $f$, is retained, when in its lowermost position, by a fixed diametrical arm, $u$, of T-shaped cross-section, the wedge-shaped ends of which enter correspondingly-shaped depressions of a ring-shaped frame, $v$, supported below the upper or neck bearing, $f^3$, of the shaft $f$, as shown in Figs. 1 and 3. The ring-shaped frame $v$ is provided with as many depressions equidistant from each other as there are screen-boxes, said depressions being arranged in the vertical radial planes of the axes of the washing or separating tanks $r'$ $r^2$ $r^3$ $r^4$, of which two connected sets or batteries are used, as shown clearly in Fig. 2. The wedge-shaped ends of the arms $u$ and the depressions of the ring-shaped frame $v$ secure the exact position of the screen-boxes $a$ in the same vertical axis as the washing-tanks $r'$ to $r^4$. This mechanism for accurately setting the entire system of screen-boxes by the center shaft into proper relative position to the tanks can also be arranged at the lower part of the apparatus, near the step-bearing $f^2$ of the shaft.

The washing-tanks $r'$ to $r^4$ are made somewhat larger than the screen-boxes and disposed equidistantly from each other and concentrically to the center shaft. The four adjoining tanks $r'$ $r^2$ $r^3$ $r^4$ are connected with each other by means of siphon-tubes $s$, which extend from the bottom of one tank to the upper part of the next tank, as shown in Figs. 2 and 6. Two such batteries of tanks are used, each consisting of four tanks, which, however, leaves an open space equal in size to one of the tanks between the two batteries, which space serves for tilting and emptying the screen-boxes when the same have been passed through all the tanks of one battery for the washing out or separating of the soluble parts of their contents. Each battery of tanks is connected at the upper end by a funnel-shaped shedding-frame, $t$, to prevent the spattering about of the washing-liquid. The washing-liquid is introduced through a suitable pipe into the tank $r'$ of each battery, passes then successively, by the pipes $s$, to the tanks $r^2$ $r^3$ $r^4$, and is then conducted off through the siphon-shaped pipe $w$ of the tank $r^4$.

The apparatus is operated as follows: The insoluble substances which are to be washed—such as, for instance, crystals of hydroxide of strontium, which have to be separated from the adhering saccharine liquor or strontium saccharate—are filled into the screen-boxes $a$, which are vertically above the tanks $r^4$ of each battery, as shown in Fig. 2. When the charging of the boxes takes place the coupling $i$, which connects the pivot-rod $g$ with the connecting-rod $l$, is uncoupled, so that the lever $d$, by which the screen-boxes are oscillated, is in a position of rest. The remaining screen-boxes continue their oscillations while the charging of two of their number takes place, as shown in Fig. 1, they being alternately raised or lowered in the washing-liquid of the remaining tanks of both batteries. As soon as the screen-boxes $a$ above the tanks $r^4$ are charged their couplings $i$ are recoupled, so that oscillating motion is imparted to the screen-boxes by the lever $d$. The washing out of the soluble parts from the crystals in the boxes just charged now commences by the action of the liquid in the tanks $r^4$ of each battery, which washing-liquid has been saturated to a considerable extent with basic saccharate, having successively served for washing in the remaining tanks of the battery, and is now at the point of being discharged from the tanks $r^4$ through pipes $w$. After the contents of the screen-boxes last charged have been exposed to the action of the washing-out process for a certain length of time the entire machine is raised to such an extent that the screen-boxes clear the tanks, during which operation care has to be taken that the bottoms of the boxes are in one horizontal plane. The entire system of screen-boxes and their oscillating mechanism is now turned around the axis of the center shaft, in the direction of the arrows in Fig. 2, to such a distance that the two boxes $a$, which have just been charged and exposed to the washing operation in the tanks $r^4$, arrive vertically above the tanks $r^3$. The center shaft, $f$, is then lowered again and locked, the transmitting mechanism being thrown into gear again, so that all the screen-boxes receive oscillating motion. The washing-out process is thus continued until each box has passed successively through all the tanks of a battery. In the last tank, $r'$, the crystals are washed with fresh cold water, which is constantly supplied thereto, and which is capable of dissolving or separating the last remaining portions of the soluble substance adhering to the crystals. With each axial motion of the entire system two of the screen-boxes $a$ arrive in the open spaces between the batteries, so that the contents can be discharged. A new charge is given to the boxes when they arrive above the tanks $r^4$, so that a continuous washing-out process takes place.

From the arrangement of the apparatus it is obvious that each box is twice discharged and charged for each revolution of the entire apparatus. The direction of motion of the washing-liquid in the tanks $r'$ to $r^4$ of each battery is in opposite direction to that in which the screen-boxes are moved. The liquid contained in the tanks $r'$ is least saturated with soluble matter. As its saturation increases the denser parts of the liquid are settled gradually near the bottom of the tank, and then passed through the siphon-tube $s$ into the second tank, $r^2$, where the liquor becomes richer in soluble substances by the washing process, whence it passes into the tanks $r^3$ and $r^4$, so that finally the richly-saturated liquid leaves the battery through the pipe $w$.

It is obvious that the number of screen-boxes, as well as the number of washing-tanks, may be altered, also the form and size of the same. Instead of arranging the screen-boxes axially around their center shaft, the same can be arranged stationary relatively to their axis, while the tanks may be arranged on a turn-table, which can be raised and lowered and operated in the same manner as the screen-boxes. The washing out or separating soluble from insoluble substances or crystals can thus be accomplished in a quick, effective, and uniform manner by the continuously-operating apparatus described, so that large quantities of such substances can thus be economically handled, which is sometimes of great advantage in the arts.

Having thus described my invention, I claim as new and desire to secure by Letters Patent—

1. An apparatus for washing out or separating soluble from insoluble substances, which consists of a series of vertically-suspended screen-boxes, of a series of tanks arranged in battery below the screen-boxes, and of mechanism whereby vertically-oscillating motion is imparted to the screen-boxes, substantially as set forth.

2. The combination of a series of vertically-oscillating screen-boxes, which are arranged equidistantly from each other and concentrically to a vertical center shaft, with a number of washing or separating tanks arranged in battery below the screen-boxes, and provided with intermediate spaces between the batteries for discharging the contents of the screen-boxes, substantially as set forth.

3. In an apparatus for separating soluble from insoluble substances, the combination of a series of vertically-suspended screen-boxes, washing-tanks arranged in battery, mechanism for imparting an oscillating motion to the screen-boxes, and mechanism, substantially as described, whereby the entire system of screen-boxes and their oscillating mechanism may be raised or lowered so as to be turned around its axis, substantially as specified.

4. In an apparatus for washing out and separating soluble from insoluble substances, a battery of washing-tanks connected by siphon-pipes $s$, and provided with a shedding-frame, $t$, at the upper part, substantially as set forth.

In testimony whereof I have signed my name to this specification in the presence of two subscribing witnesses.

HERRMANN SCHAEDE.

Witnesses:
  B. ROI,
  CARL FEHLERT.